Feb. 24, 1931.    P. S. SHIELD    1,794,209
LIQUID MEASURING OR DISPENSING APPARATUS
Filed Aug. 17, 1926    2 Sheets-Sheet 1

Inventor
Paul S. Shield
By his Attorney

Feb. 24, 1931.  P. S. SHIELD  1,794,209
LIQUID MEASURING OR DISPENSING APPARATUS
Filed Aug. 17, 1926    2 Sheets-Sheet 2
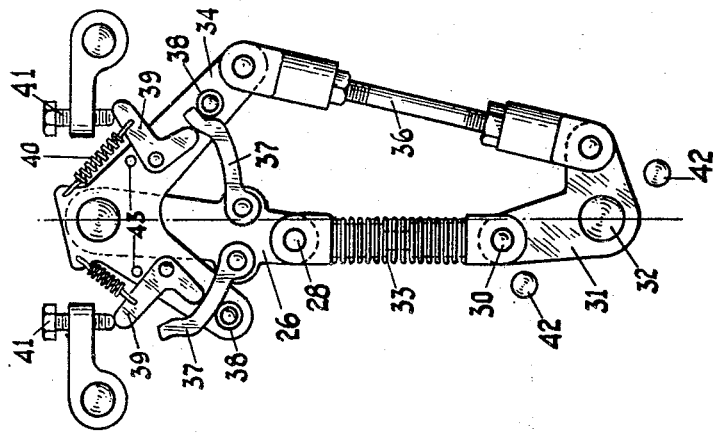
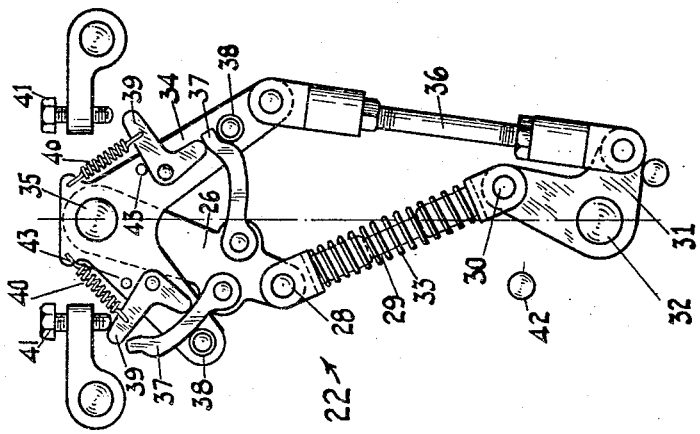
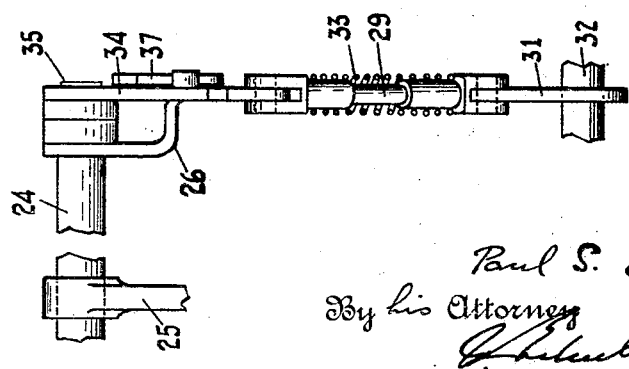

Patented Feb. 24, 1931

1,794,209

UNITED STATES PATENT OFFICE

PAUL S. SHIELD, OF CINCINNATI, OHIO, ASSIGNOR TO AUGUSTINE DAVIS, JR., OF CINCINNATI, OHIO

LIQUID MEASURING OR DISPENSING APPARATUS

Application filed August 17, 1926. Serial No. 129,761.

The invention relates to that type of liquid measuring or dispensing apparatus having twin measuring chambers which are alternately filled and emptied, one being filled while the other is emptying, and vice-versa, as long as the operation continues, or until the required number of unit quantities have been delivered, and wherein automatic movement of valve mechanism to reverse the conditions of flow is initiated by pressure developed in the filled chamber as the result of the closing of a vent, the further movement of the valve mechanism being caused by a spring or equivalent mechainsm which is brought into action always in advance of center, in respect to movement of the valve means in both directions. This actuating mechanism may be termed a snap-over or carry-over action, since it acts in either direction on being carried past a dead center. The dead center past which this mechanism acts must lie in different positions in the opposite strokes, in order that the mechanism shall take up and carry on the movement of the valve means always in advance of the center of movement thereof. Heretofore, this has been accomplished by so designing the snap-over mechanism that it resets or re-establishes a fulcrum at the end of each stroke, in respect to the next succeeding stroke in the reverse direction.

In the present invention a snap-over action is provided in which a fulcrum or center is shifted by and simultaneously with the fore part of each stroke of the valve mechanism. In this way a very positive and reliable operation is secured; and a further advantage is that a mechanism is obtained which is adapted for inexpensive, quantity methods of manufacture, and is easy and inexpensive to keep in order and repair.

The invention also includes an improved single piston valve which controls the flow to and from both measuring chambers and which is shifted in the fore part of its stroke by the pressure of the liquid acting directly on it. For this purpose, a piston has heretofore been provided having open ends and a central wall against which the fluid pressure acts, the flow of liquid both to and from the measuring chambers being compelled to pass through the hollow interior of the piston, which is divided into two spaces. A drawback of this form of single piston device is that the flow passages are rather restricted, so that the action of the dispenser in making deliveries is comparatively slow. According to the present invention such a piston is provided with solid ends against which the pressure acts and past which the discharging liquid flows from the measuring chambers, only the flow to these chambers passing through the interior of the valve. In this way the flow is made more rapid, while the important simplicity of the single pressure-actuated piston and valve is retained.

In the accompanying drawings forming part hereof:

Fig. 3 is a view on a larger scale of the snap-over action seen in Fig. 2;

Fig. 4 is a rear elevation of the snap-over action, showing the same in one of its extreme or rest positions; and Fig. 5 is a view similar to Fig. 4, showing the snap-over action to have been shifted by the pressure on the valve to a position in which it will carry the valve past its mid position and to the end of its stroke.

Figure 1:
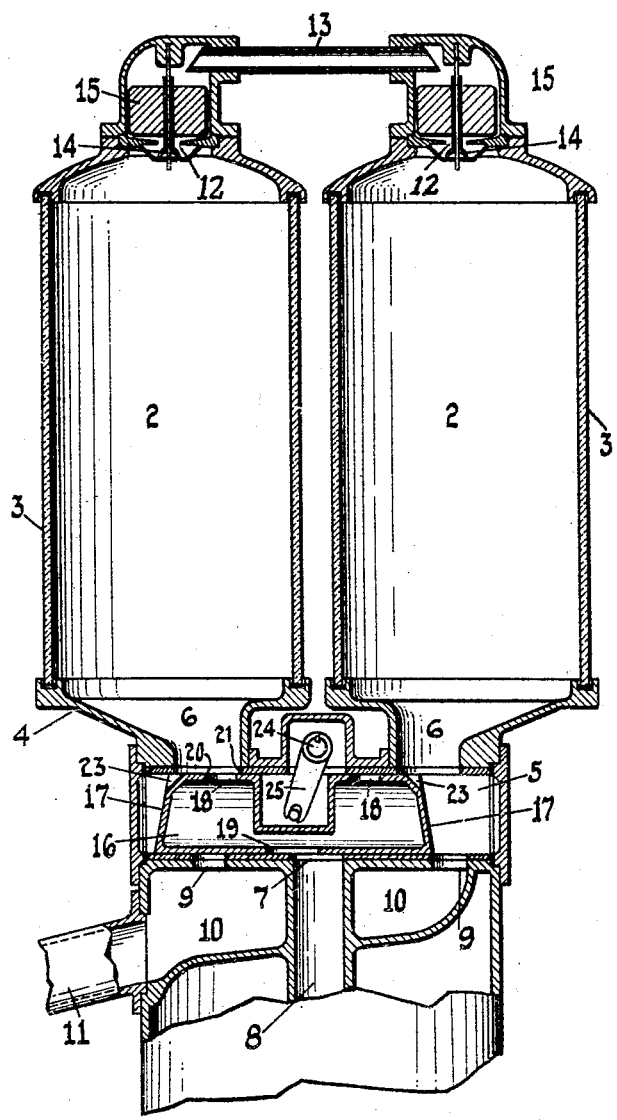
Fig. 1 is a vertical sectional view of a dispensing apparatus embodying the invention, the section being taken on the line 1—1 of Fig. 2.
Figure 2:
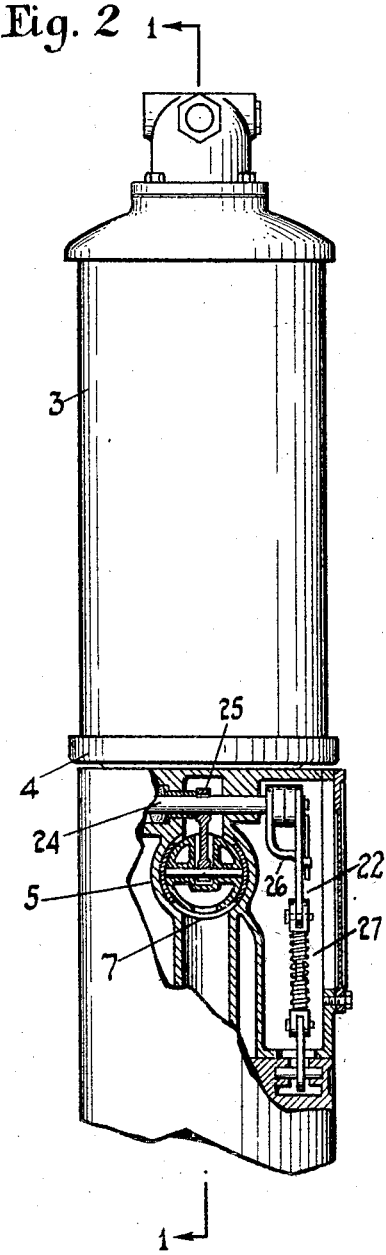
Fig. 2 is an elevation looking at right angles to Fig. 1, with a portion broken out and shown in central vertical transverse section.

Two measuring chambers of unit capacity are marked 2, these chambers being provided with visible glass cylinders 3. The measuring chambers are mounted on a suitable frame or stand 4, of which a portion is shown. This frame contains a transverse cylindrical valve case 5 beneath the measuring chambers and communicating therewith by large passageways 6. An opening 7 in the valve case communicates with a supply passage 8 from a pump (not shown), which raises gasoline from an underground tank and delivers it under moderate pressure to the measuring apparatus. Two openings 9 in the bottom of the valve case connect the interior of the case at its ends with a discharge space 10 having an outlet nozzle 11, to which the dispensing hose is connected. The measuring chambers are provided at the top with air-vent openings 12, preferably interconnected by a pipe 13, these vents being automatically closed when each chamber is filled by valves 14 connected to floats 15.

A hollow piston valve 16 having closed ends 17 is fitted to reciprocate in the valve case. It has two ports 18 in its top, at opposite sides of the center, to admit the liquid through the passageways 6 to the measuring chambers, and an opening 19 which communicates with the supply opening 7.

In Fig. 1 the valve is shown in its left-hand position, closing the left-hand discharge opening 9 and leaving the right-hand discharge opening 9 uncovered. The left-hand supply port 18 of the valve is open to the left-hand passage 6, while the right-hand supply port 18 is blanked. Liquid is consequently flowing out of the right-hand measuring chamber 2, past the end of the piston, to the exit 11, assuming that chamber to have been filled, and is being delivered from the supply by way of the hollow interior of the piston to the left-hand chamber 2.

When the left-hand chamber becomes full, its float 15 closes its vent valve 14. Thereupon pressure is developed on the liquid in this chamber, which acts upon the left-hand closed end of the piston, forcing this piston toward the right. When the point 20 of the left-hand supply port of the piston reaches the point 21 of the wall of the valve case, pressure is cut off from the left-hand measuring chamber, so that the movement of the piston would cease were it not carried on by the snap-over action 22 to be described. It will be observed that the relations of the ports and passages are such that the supply to each measuring chamber is cut off before the outlet therefrom is opened, and vice-versa, the outlet from each chamber is closed before the supply is opened to that chamber.

The ends 17 of the piston are preferably inclined downwardly and outwardly, and provided with external channels 23, the more conveniently to enable the pressure in the filled chamber to be applied to the end of the piston, but it will be apparent that the openings 6 in the top of the valve case might be extended to the ends of the case with like effect.

The snap-over action 22 comes into play at a point in advance of the center of travel of the piston in respect to both directions of movement, in order to complete the movement of the piston to its other extreme position, to reverse the conditions of flow to and from the measuring chambers.

A rock-shaft 24 is connected by a lever arm 25 with the central part of the piston, so as to be moved by the piston in the fore part of its travel in each direction, thereby carrying the snap-over mechanism to and past a center, thereafter to continue the movement of the piston under the action of said mechanism.

Said rock-shaft or pivot has another lever arm 26 fixed to it in a mechanism chamber 27, and this lever is pivotally connected at 28 to another link or lever 29, which is pivoted at 30 to a bell-crank 31, which is pivoted at 32 to a fixed pivot. The levers 26 and 29 form a toggle, and the bell-crank 31 constitutes an oscillatory shiftable fulcrum member. The link or lever 29 is of telescopic construction so as to be extensible an contractible and carries an expansion spring 33, constituting a power element. However, it is to be understood that the invention is not limited to the particular source of power that energizes the snap-over or carry-over mechanism, or to the precise form of the mechanism, which may be varied.

The fulcrum member 31 is shifted by and simultaneously with the fore part of the movement of the valve piston 16 by means, the prefererd form of which is as follows: A rocker 34 is mounted to oscillate about an extension 35 of the rock-shaft 24, and is connected with the member 31 by a pitman link 36. Two reversely extending dogs 37 are pivoted to the lever 26 and are formed for thrust engagement with studs or rollers 38 on the rocker 34. The dogs are alternately locked in engagement with said rollers by bell-crank detents 39 pivoted on the rocker and actuated by springs 40. At a point in advance of each extreme of movement of the mechanism, that is to say when the toggle levers pass their line of centers, the free arm of the detent 39 then locking one of the dogs encounters one of two adjustable screw stops or trips 41, causing the detent to release the dog so that it may over-travel the rocker. The movement of the pivoted fulcrum member 31, and thereby the movement of the rocker 34, is limited in both directions by stops 42. The movement of the detents 39 under the action of the springs 40 is limited by stops 43.

The adjustable trips 41 enable the dogs or connections 37 to be unlocked or disconnected at the proper points in the movement of the mechanism, without necessity for special accuracy in the manufacture of the parts. The pitman 36 also provides for adjustment, as shown.

In operation, while the piston is moving to the right under fluid pressure, the toggle lever device is being moved from an angular position toward its line of centers. At the same time the fulcrum member 31 is being moved to the left, so that the dead center past which the lever device must be carried in order that the spring 33 may act is shifted in the reverse direction past the space center. Consequently, the spring takes up the movement of the valve at a point in advance of its center of travel and carries it through to the right-hand position.

Similarly, when the valve is being moved to the left under fluid pressure, it moves the toggle toward a straightened condition, and this condition, owing to the simultaneous shifting of the fulcrum member 31, occurs at the other side of the space center, so that the movement of the valve is again taken up by the spring in advance of the center of valve travel.

It will be observed that the action of the mechanism is positive, and that its nature is such that expensive machined or hand-made parts are avoided and that adjustment, replacement and repair service is simple.

I claim:

1. In a measuring or dispensing apparatus having a pair of measuring chambers which are alternately charged and discharged, one chamber discharging while the other is being charged, said chambers being provided with vents and means for automatically closing the same when the chambers are charged, and a piston valve which controls the charging and discharging of the two chambers and movement of which to reverse the conditions of flow is initiated by the pressure developed in each chamber when its vent is closed; a snap-over spring mechanism interconnected with said piston valve so as to be acted upon thereby when said piston valve is moved by the fluid pressure, said mechanism comprising a lever device having a shiftable fulcrum and connections between said piston valve and said fulcrum whereby said fulcrum is shifted by and simultaneously with the fore part of the movement of said piston valve, in order that said snap-over spring mechanism shall become active in advance of the center of movement of said piston valve in both directions to complete the movement of the same.

2. In a measuring or dispensing apparatus having a pair of measuring chambers which are alternately charged and discharged, one chamber discharging while the other is being charged, said chambers being provided with vents and means for automatically closing the same when the chambers are charged, and a piston valve which controls the charging and discharging of the two chambers and movement of which to reverse the conditions of flow is initiated by the pressure developed in each chamber when its vent is closed; a snap-over spring mechanism interconnected with said piston valve so as to be acted upon thereby when said piston valve is moved by the fluid pressure, said mechanism comprising a lever device having a shiftable fulcrum and connections between said piston valve and said fulcrum whereby said fulcrum is shifted by and simultaneously with the fore part of the movement of said piston valve, and means whereby said connections are automatically connected and disconnected in alternation, in order that said snap-over spring mechanism shall become active in advance of the center of movement of said piston valve in both directions to complete the movement of the same.

3. In an apparatus of the character described having twin measuring chambers and valve means to control the flow to and from said measuring chambers, the movement of which to reverse the conditions of flow is initiated by fluid pressure, an oscillatory mechanism comprising a rock-shaft connected with said valve means, an arm fixed to the rock-shaft, a second arm pivoted to the first, one of said arms being extensible and contractible and having a spring, a shiftable fulcrum member to which the second arm is connected, an oscillatory member, means connecting said oscillatory member with said fulcrum member to shift the same, dogs operated by the rock-shaft to act alternately upon said oscllatory member in opposite directions to oscillate the same, and means for automatically locking and unlocking said dogs, in order that said spring shall become active in advance of the center of movement of said valve means in both directions to complete the movement of the same.

4. In an apparatus of the character described having twin measuring chambers, and valve means to control the flow to and from said chambers, the movement of which to reverse the conditions of flow is initiated by fluid pressure, an oscillatory mechanism comprising a rock-shaft connected with said valve means, an arm fixed to the rock-shaft, a second arm pivoted to the first, one of said arms being extensible and contractible and having a spring, an oscillatory fulcrum member to which the second arm is connected, an oscillatory shifting member, a pitman connecting said shifting member with the fulcrum member, and means operated by the rock-shaft to move said oscillatory shifting member in opposite directions, in order that said spring shall become active in advance of the center of movement of said valve means in both directions to complete the movement of the same.

5. In an apparatus of the character described having twin measuring chambers, a valve to control the flow to and from said chambers, the movement of which valve to reverse the conditions of flow is initiated by fluid pressure, a power element and means for causing the same to act upon said valve in advance of a center in respect to its movement in both directions, said means comprising a lever operatively connected with said valve, a shiftable fulcrum member for said lever, and connections between said valve and said fulcrum member whereby said fulcrum member is shifted by said valve and simultaneously with the fore part of the movement thereof in both directions.

6. In an apparatus of the character described having twin measuring chambers, a valve to control the flow to and from said chambers, the movement of which valve to reverse the conditions of flow is initiated by fluid pressure, a power element and means for causing the same to act upon said valve in advance of a center in respect to its movement in both directions, said means comprising a lever operatively connected with said valve, a shiftable fulcrum member for said lever, and connections between said valve and said fulcrum member whereby said fulcrum member is shifted by said valve and simultaneously with the fore part of the movement thereof in both directions, and means for automatically disconnecting said connections to permit the completion of the movement.

7. In an apparatus of the character described having twin measuring chambers and valve means to control the flow to and from said twin measuring chambers, the movement of which to reverse the conditions of flow is initiated by fluid pressure, a snap-over action for completing the movement of the valve means, comprising a lever device operatively connected with the valve means, a shiftable fulcrum member to which said lever device is connected, connections operatively connected with the valve means for shifting said fulcrum, and adjustable trip means for causing automatic disconnection of said connections.

PAUL S. SHIELD.